United States Patent
Shannon et al.

(10) Patent No.: US 9,327,554 B2
(45) Date of Patent: May 3, 2016

(54) DYNAMICALLY VULCANIZED THERMOPLASTIC ELASTOMER LAMINATES

(75) Inventors: Porter C. Shannon, Seabrook, TX (US); Jay K. Keung, Humble, TX (US); Peter William Manders, Hudson, OH (US); Dennis E. McGee, Penfield, NY (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 269 days.

(21) Appl. No.: 14/004,062

(22) PCT Filed: Mar. 29, 2011

(86) PCT No.: PCT/US2011/030345
§ 371 (c)(1),
(2), (4) Date: Oct. 30, 2013

(87) PCT Pub. No.: WO2012/134454
PCT Pub. Date: Oct. 4, 2012

(65) Prior Publication Data
US 2014/0150947 A1    Jun. 5, 2014

(51) Int. Cl.
| | | |
|---|---|---|
| *B60C 1/00* | (2006.01) | |
| *C08J 5/12* | (2006.01) | |
| *C08J 7/04* | (2006.01) | |
| *B60C 5/14* | (2006.01) | |
| *B29D 30/06* | (2006.01) | |
| *C09J 7/02* | (2006.01) | |

(52) U.S. Cl.
CPC .......... *B60C 1/0008* (2013.04); *B29D 30/0681* (2013.01); *B60C 5/14* (2013.01); *C08J 5/124* (2013.01); *C08J 7/047* (2013.01); *C09J 7/0282* (2013.01); *B60C 2005/145* (2013.04); *C08J 2321/00* (2013.01); *C08J 2461/00* (2013.01); *C08J 2479/00* (2013.01); *Y10T 428/265* (2015.01)

(58) Field of Classification Search
CPC ............. B29D 30/0681; B60C 1/0008; B60C 2005/145; B60C 5/14; C08J 2321/00; C08J 2461/00; C08J 2479/00; C08J 5/124; C08J 7/047; C09J 7/0282; Y10T 428/265
See application file for complete search history.

(56) References Cited

U.S. PATENT DOCUMENTS

| | | | |
|---|---|---|---|
| 4,223,115 A | 9/1980 | Zalucha et al. | |
| 6,136,123 A * | 10/2000 | Kaido et al. | 156/123 |
| 6,402,867 B1 | 6/2002 | Kaido et al. | |
| 8,236,878 B2 | 8/2012 | Lewtas et al. | |
| 2003/0207121 A1* | 11/2003 | McGee | C08F 2/22 428/422.8 |
| 2009/0076212 A1* | 3/2009 | Lewtas et al. | 524/505 |
| 2011/0054093 A1* | 3/2011 | Ellul et al. | 524/168 |

FOREIGN PATENT DOCUMENTS

| | | |
|---|---|---|
| EP | 1666242 | 6/2006 |
| WO | WO2007/050236 | 5/2007 |

\* cited by examiner

*Primary Examiner* — Philip Tucker
*Assistant Examiner* — Jimmy Smith, Jr.

(57) ABSTRACT

Disclosed herein is a process to produce a laminate comprises coating at least an outer surface of a dynamically vulcanized alloy film with an adhesive composition to produce the laminate, wherein the adhesive layer has a thickness of less than or equal to about 5 microns, wherein the dynamically vulcanized alloy film comprises a thermoplastic elastomer composition containing a thermoplastic resin as a continuous phase, and a rubber composition dispersed therein, as a dispersed phase. A laminate and a pneumatic tire comprising the laminate are also disclosed.

14 Claims, 4 Drawing Sheets

DYNAMICALLY VULCANIZED THERMOPLASTIC ELASTOMER LAMINATES

CROSS-REFERENCE TO RELATED APPLICATIONS

This application is a 371 National Stage Application of International Application No. PCT/US2011/030345, filed Mar. 29, 2011, the disclosure of which is hereby incorporated by reference in its entirety.

BACKGROUND OF THE INVENTION

The present invention relates to thermoplastic elastomer composition laminates particularly useful for tire and other industrial rubber applications and processes for producing such compositions.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same. However, since these materials are thermoplastic resin/thermoplastic resin blends, while they are superior in gas barrier performance, they lack flexibility, and therefore, such films are subject to failure if they are used in a vehicle tire which is subject to significant stress and flexing.

Further, there are also examples of the use of a thermoplastic elastomer composed of a rubber and a thermoplastic resin for use as an innerliner or in a tire; but in general, a flexible material of the type disclosed therein and having superior durability has low heat resistance. With a thermoplastic elastomer using a thermoplastic resin having a melting point less than the tire vulcanization temperature as a matrix, when the tire vulcanization bladder is released at the end of the tire vulcanization cycle, the tire inside surface is subject to appearance defects due to the thermoplastic resin sticking to or rubbing against the vulcanization bladder.

When preparing tire innerliners for assembly with a tire carcass, a thermoplastic elastomer may be co-extruded together with an adhesive layer in two layers in cylindrical shapes. If the adhesive layer arranged at the outside is too tacky, it will stick to the take-up roll at the time of shaping and seriously degrade the workability. Further, this requires the insertion of release paper, Mylar® film, etc., between the tubular materials at the time of take-up-which is a problem in terms of cost and transport weight. On the other hand, if the adhesive layer is insufficiently tacky, at the time of tire production, there is the problem that the thermoplastic elastomer layer may end up peeling off from the tire carcass thereby making tire manufacturing difficult. These limitations of the prior art approaches to achieving an adhesive coated thermoplastic elastomeric layer for tire linnerliners suggest that there is a continuing need for improvements, as have been accomplished by use of the processes and compositions of the present invention.

SUMMARY OF THE INVENTION

In accordance with an embodiment of the invention, a process to produce a laminate comprises coating at least a portion of an outer surface of a dynamically vulcanized alloy film with an adhesive composition to produce the laminate, wherein the adhesive layer has a thickness of less than or equal to about 10, wherein the dynamically vulcanized alloy film comprises a thermoplastic elastomer composition containing a thermoplastic resin as a continuous phase, and a rubber composition dispersed therein, as a dispersed phase.

In an embodiment, a laminate comprises a dynamically vulcanized alloy film coated on at least an outer surface with an adhesive composition, wherein the adhesive layer has a thickness of less than or equal to about 5 microns, wherein the dynamically vulcanized alloy film comprises a thermoplastic elastomer composition containing a thermoplastic resin as a continuous phase, and a rubber composition dispersed therein, as a dispersed phase.

In another embodiment, the coating of the dynamically vulcanized alloy film comprises gravure coating, reverse roll coating, knife over roll coating, metering rod coating, slot die coating, dip coating, curtain coating, air knife coating, or a combination thereof. The coating is deposited on the surface of the dynamically vulcanized alloy film at a rate of less than or equal to about 5 g/m$^2$.

In an embodiment, the adhesive composition comprises a polyethyleneimine. The polyethyleneimine polymer may be functionalized with an ethenically unsaturated moiety selected from the group consisting of acrylic, methacrylic, enamine, and a combination thereof. Alternatively, the polyethyleneimine polymer may be functionalized with an ethenically unsaturated moiety selected from the group consisting of 2-hydroxy-3-chloropropylacrylate, glycidyl methacrylate, glycidyl acrylate, acetoacetoxyethyl methacrylate, and a combination thereof.

In another embodiment, the adhesive composition comprises a functionalized amino-functional polymer which is a condensation product of a reaction between an amino-functional polymer comprising reactive amine hydrogens with a functionalizing agent selected from the group consisting of a halo-functional monomer, a halo-functional oligomer, a carbonyl-functional monomer, a carbonyl-functional oligomer, an epoxy-functional monomer, an epoxy-functional oligomer, a poly-functional acrylic monomer, a poly-functional acrylic oligomer, a poly-functional methacrylic monomer, a poly-functional methacrylic oligomer, and combinations thereof.

In any of the embodiments, the adhesive composition specifically excludes the presence of an epoxidized styrene-butadiene-based block copolymer.

In another embodiment, a pneumatic tire comprises a laminate comprising a dynamically vulcanized alloy film coated on at least an outer surface with an adhesive composition, wherein the adhesive layer has a thickness of less than or equal to about 5 microns, wherein the dynamically vulcanized alloy film comprises a thermoplastic elastomer composition containing a thermoplastic resin as a continuous phase, and a rubber composition dispersed therein, as a dispersed phase.

DETAILED DESCRIPTION

Preferred applications of the present invention relate to thermoplastic elastomer compositions for tire innerliner and barrier films, more particularly to thermoplastic elastomer compositions exhibiting excellent durability and impermeability to fluids such as air, as well as to liquids. Preferred compositional features are directed to enhanced or maximized content of dispersed halogenated, preferably brominated, isobutylene elastomers in the form of vulcanized particles dispersed in a continuous thermoplastic matrix. Additionally, particularly preferred aspects of the invention relate to efficient mixing processes suitable for producing a thermoplastic elastomer composition capable of providing a rubber domain comprising small sized particles while such domains are also highly extensible and elastic. Furthermore, the invention includes processes for producing pneumatic tires and hoses using the above compositions.

The preferred elastomer exhibits low permeability and is preferably a polymer such as halogenated isobutylene-containing elastomers and particularly preferred are brominated elastomers, especially brominated paramethylstyrene-co-isobutylene polymers; especially preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

Throughout the entire specification, including the claims, the following terms shall have the indicated meanings as set forth below.

Polymer may be used to refer to homopolymers, copolymers, interpolymers, terpolymers, etc. Likewise, a copolymer may refer to a polymer comprising at least two monomers, optionally with other monomers. All molecular weights are weight average unless otherwise noted.

When a polymer is referred to as comprising a monomer, the monomer is present in the polymer in the polymerized form of the monomer or in the derivative form of the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)" or "polymer(s)".

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

The present invention in various embodiments comprises a process of coating at least a portion of an outer surface of a dynamically vulcanized alloy (DVA) comprising a thermoplastic elastomer composition with an adhesive. A dynamically vulcanized alloy composition suitable for use herein is disclosed in the co-assigned WO2007/050236, which is fully incorporated by reference herein.

Thermoplastic Elastomer—Elastomer Component

The elastomer of the thermoplastic elastomer in one embodiment comprises at least one halogenated rubber. Typically, it is present in a composition with a thermoplastic resin described hereinbelow, in a weight ratio of rubber to resin of about 55/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this embodiment include halogenated isobutylene-based homopolymers or copolymers, including random copolymers of a $C_4$ to $C_7$ isomonoolefin derived unit, such as isobutylene derived unit, and at least one other polymerizable unit. In one embodiment, the halogenated isobutylene-based copolymer is a butyl-type rubber or branched butyl-type rubber, especially brominated versions of these elastomers.

Butyl rubbers are typically prepared by reacting a mixture of monomers, the mixture having at least (1) a $C_4$ to $C_{12}$ isoolefin monomer component such as isobutylene with (2) a multiolefin monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1- pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, methylstyrene, chlorostyrene, methoxystyrene, indene and indene derivatives, and combinations thereof are also suitable for homopolymerization or copolymerization in butyl rubbers. One embodiment of the butyl rubber polymer useful in an embodiment is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the embodiments herein are not limited by the halogenation process. Post-treated halogenated butyl rubber can also be used as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is halogenated, branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the embodiments are not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Other useful butyl rubbers are isoolefin/para-alkylstyrene copolymers that include random copolymers comprising a $C_4$ to $C_7$ isoolefin and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers are derived from monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Useful isoolefin copolymers are those derived from isobutylene and alkylstyrene.

Most useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly(isobutylene-co-p-methylstyrene) (BIMS). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

Thermoplastic Elastomer—Secondary Elastomer Components

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Generally, other optional rubbers useful in the present embodiments include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

A second rubber component that is more efficient in reducing low temperature modulus than BIMS can be advantageous for improving low temperature performance of the overall composition. Preferably, the secondary rubber is based on functionalized rubbers exhibiting low glass transition temperatures, Tg, preferably less than −30° C. The low Tg contributes to reduced modulus (enhanced softness) of the secondary rubber at operating or use temperatures of products containing such rubbers, for example, tire innerliners, of about −20° C. or less. Suitable functionality includes maleic anhydride, acyllactam, or others that can readily react with amine functionality present in polyamides. The presence of chemically reactive functionality in such rubbers further promotes reactive compatibilization between the secondary rubber and polyamide leading to a small particle size dispersion of the rubber in the polyamide matrix, the particles exhibiting an average particle size of about 1 micron or less; preferably less than about 0.5 micron.

The secondary rubber, dispersed in the polyamide matrix in the form of small particles, as noted, can optionally be cured, crosslinked or vulcanized, partially, substantially or fully, as described with regard to the halogenated or BIMS elastomer. Such crosslinking can be accomplished in the course of dispersing the secondary rubber in the polyamide matrix by using the same dynamic vulcanization method applied to the halogenated elastomer component. If dynamic vulcanization is used, it is also necessary to disperse a suitable curing agent or curing system in the secondary rubber in order to effect vulcanization during mixing and dispersion of the rubber.

Alternatively, if the secondary rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the secondary rubber be dispersed in the polyamide matrix in the form of small particles having an average particle size of about 0.1 micron to about 1 micron; for example about 0.1 micron to about 0.75 micron; or about 0.1 micron to about 0.5 micron.

Thermoplastic Elastomer—Thermoplastic Resin Component

In embodiments, a useful thermoplastic resin is defined to be any thermoplastic homopolymer, copolymer or mixture thereof having a Young's modulus of more than 500 MPa and, preferably, a Mocon air permeation coefficient of less than $25 \times 10^{-12}$ cc-cm/cm$^2$-sec-cm Hg at 30° C., and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation): vinyl acetate (EVA), polyvinyl alcohol (PVA), ethylene-vinyl alcohol polymers (EVOH), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified thermoplastic resins within each of a) through n) inclusive.

For purposes herein, the Mocon air permeation coefficient is determined by placing pellets of the polymer in a convection oven at 60° C. for between 12 and 20 hours. The pellets are then extruded into a film using a Rheocord 300P laboratory scale extruder (ThermoFisher Scientific, USA) equipped with a single screw barrel (Rheomix 252P) and a 2" tape die (Haake part #557-2302), or an equivalent thereof. The die gap is set to approximately 1.5 mm, and a standard conveying screw with a Maddocks mixing head (Haake part #2300044) is utilized, or an equivalent thereof. The temperature profile setpoints for Zone 1, 2, 3 and the die are about 210° C., 220° C., 230° C. and 230° C. The extrusion speed is set at a constant 48 RPM. The two inch film produced is then cast onto a chill roll maintained at 30° C., and the draw speed is set such that the final film gauge is 1 mm. Samples of the film are then pressed in a mold press at 425° C. for about 60 seconds in order to generate two defect free sample plaques that are 0.35 mm+/−0.05 mm gauge. Molded plaques are then placed in a vacuum oven at 150° C. for two hours. A 58 mm circular die is used to cut a part from each molded plaque for permeability testing.

The permeability test is performed according to methods known to one of skill in the art. For purposes herein, the test is performed at 60° C. at less than 2% relative humidity on a MOCON OXTRAN 2/61 (Mocon, Minneapolis, Minn., USA), or an equivalent thereof. Samples are tested in duplicate, by placing an individual sample in a 10 cm$^2$ fixture and initiating testing according to the manufacture's instructions. A baseline oxygen permeability is first determined with nitrogen during three 30 minute cycles. Oxygen transmission rates are then determined through three 30 minute cycles with air. Results from the two samples are then compared, and if the results are within 5% the data is averaged and reported. If not, the data is abandoned and test restarted with a freshly pressed sample. Permeability is calculated per standard methods known to one of skill in the art, e.g., as recommended by MOCON. Values are also compensated for ambient barometric pressure.

For purposes herein, this definition of thermoplastic resin excludes polymers of olefins, such as polyethylene and polypropylene.

Preferred thermoplastic resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Thermoplastic Elastomer—Other Components

Since the thermoplastic resin and the halogenated elastomer differ significantly in solubility, a compatibilizing ingredient may be useful for the purposes of enhancing compatibility of these polymers. Furthermore, without wishing to be bound by theory, the fine rubber dispersions obtained in the compositions of some embodiments may be the result, in part, of chemical reaction(s) between, e.g., benzylic bromine present in BIMS, or allylic halogen in halogenated butyl, and terminal amines in thermoplastic polyamides at the phase boundary between the dispersed rubber particles and the thermoplastic which are formed during mixing and potentially by modifying, in particular reducing, the surface tension between the rubber and thermoplastic resin components. The occurrence of interfacial reactions during blending and simultaneous reaction of two immiscible polymers can help to avoid coalescence of the small particle-size dispersed rubber phase, thereby leading to particularly fine dispersions of the rubber phase. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Suitable compatibilizers include ethylenically unsaturated nitrile-conjugated diene-based high saturation copolymer rubbers (HNBR), epoxylated natural rubbers (ENR), acrylate rubber, and mixtures thereof, as well as copolymers having the same structure of the thermoplastic resin or the elastomeric polymer, or a structure of a copolymer having an epoxy group, carbonyl group, halogen group, amine group, maleated group, oxazoline group, or hydroxyl group capable of reacting with the thermoplastic resin or the elastomer. Other compounds used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines Examples include maleic anhydride-grafted ethylene-ethyl acrylate copolymers (a solid rubbery material available from Mitsui-DuPont as AR-201 having a melt flow rate of 7 g/10 min measured per JIS K6710), butylbenzylsulfonamide (BBSA), poly(isobutylene succinic anhydride), and the like.

The amount of compatibilizer is typically about 0.5 to about 10 parts by weight; preferably about 3 to about 8 parts by weight, based upon 100 parts by weight of the total of the elastomer. In an embodiment, the thermoplastic resin is essentially free of BBSA.

As already discussed, if the amount of compatibilizer is also a plasticizer is relatively high, it may interfere with film formation, as well as result in bloom on pellets of the DVA during storage. It is within the scope of this invention to reduce the amount of compatibilizer in the DVA, either by the use of a different material that does not result in the same issues as already known compounds, see U.S. patent application Ser. No. 12/548,797 filed Aug. 27, 2009, or by using a smaller wt percent of plasticizer.

However, the presence of one or more compatibilizer on the surface of a film of the thermoplastic elastomeric composition may interfere with the adhesive adhering to the thermoplastic elastomeric composition, and/or may influence the adhesive properties of the adhesive layer disposed on the surface of the thermoplastic elastomeric composition.

In an embodiment, the dynamically vulcanized alloy comprises a thermoplastic elastomer composition which has been treated by chemical means (e.g., washing with solvent), by physical means (e.g., heating, squeezing, or the like), or a combination thereof to reduce the amount of compatibilizer present in the thermoplastic elastomer composition prior to coating of the composition with an adhesive. In an embodiment, the compatibilizer present in the thermoplastic elastomer composition comprises butylbenzylsulfonamide (BBSA), poly(isobutylene succinic anhydride), a combination thereof, or the like.

In an embodiment, the thermoplastic elastomer composition is heated to a temperature and for a period of time sufficient to reduce the amount of BBSA present in the thermoplastic elastomer composition relative to the amount of BBSA present in the thermoplastic elastomer composition prior to heating. Such heating may be accomplished by passing the thermoplastic elastomer composition over or between hot rollers, by heating in an oven, or the like.

In another embodiment, the thermoplastic elastomer composition is contacted with a solvent in an amount sufficient to reduce the amount of BBSA, poly(isobutylene succinic anhydride), a combination thereof, or the like present in the thermoplastic elastomer composition relative to the amount of BBSA, poly(isobutylene succinic anhydride), a combination thereof, or the like present in the thermoplastic elastomer composition prior to contact with the solvent. Suitable solvents include water and/or organic solvents, including alkanes, aromatic alkanes, alcohols, amines, halogenated alkanes, and the like.

Secondary polymers may function as compatibilizers and can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. Examples include poly(isobutylene succinic anhydride), a combination thereof, or the like.

The secondary rubber can be selected based upon the type of the thermoplastic resin polymer and rubber polymer to be mixed. Such useful secondary rubbers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like, poly(isobutylene succinic anhydride) and the like, and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Polymers suitable to make functionalized polymers useful herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers includes polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Another class of particularly preferred polymers include polymers of a $C_4$ to $C_7$ isoolefin (such as isobutylene) copolymerized with one or more of isoprene and isobutylene. Preferably such isobutylene polymers are modified with maleic acid or maleic anhydride. Particularly preferred functionalized polymer include maleated copolymers of isobutylene and isoprene, maleated copolymers of isobutylene and paramethylstyrne, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride, succinic anhydride, or a combination thereof, present at a concentration of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride, succinic anhydride, or a combination thereof. Also preferably the level of maleic anhydride, succinic anhydride, or a combination thereof (collectively represented herein by the designation MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still preferably about 0.75 to about 3.5 wt %; such as about 1.5 to about 2.5 wt % of maleic anhydride. The functional group content of the grafted polymer may be determined by Fourier Transform Infrared (FTIR) spectroscopy based on a calibration with standards whose absolute functional group content has been determined.

By having another rubber, the overall rubber content, counting both BIMS rubber and at least one secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the BIMS particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for BIMS), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, particularly where a mixture of high diene rubber and a less reactive elastomer is used.

For purposes of dynamic vulcanization in the presence of a thermoplastic resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene. Dynamic vulcanization according to an embodiment can occur prior to, during and/or following coating, preferably prior to the coating step or process.

Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, radical initiators, etc. and heating the composition or mixture. The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric halogenated copolymer component of the present invention include zinc oxide in combination with zinc stearate or stearic acid and, optionally, one or more of accelerators or vulcanizing agents. Peroxide curatives are specifically excluded from the thermoplastic elastomer in an embodiment when there is present one or more thermoplastic resins that would cause such the resins to crosslink themselves in the presence of peroxide, resulting in an excessively cured, non-thermoplastic composition.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, the entire available curative is consumed in the formation of effective crosslinks which join individual polymer chains to one another and enhance the overall strength of the polymer matrix. Numerous accelerators are known in the art. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the precompounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic. The dynamically vulcanized halogenated rubber component is preferably dispersed in the polyamide matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

For purposes of the present invention, the BIMS component is also referred to as a low-grafting efficiency elastomer and the secondary rubbers are referred to as high-grafting efficiency rubbers. In each instance, grafting refers to grafting onto the polyamide(s) that are present in the composition. This distinction in efficiency and the method for measuring the performance of the polymers are described further below.

Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. However, the dynamic vulcanization process can be modified, as described below, in order to achieve further advantages.

It will be appreciated that the vulcanizable rubber, typically the first rubber, for example the halogenated isobutylene elastomer such as BIMS (or a mixture of such rubbers), will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, for example according to dynamic vulcanization technology as described herein, it too typically will be cured to at least 50% of the maximum state of cure of which it is capable based on its curative or cure system and the time and temperature at which it is processed. Alternatively, as discussed herein, such second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

Dynamic vulcanization can be carried out in various types of commercial equipment generally available in the rubber and plastics industry including Banbury® internal mixers, roll mixers, and mixing extruders. A preferred mixing device is a twin-screw extruder with intermeshing screws. Mixing is generally conducted under such time and temperature conditions that the dispersed rubber particles, particularly the first rubber component, are dispersed and cured and/or interact with the polyamide to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 230° C. to about 265° C.; alternatively, about 235° C. to about 260° C.; such as about 240° C. to about 260° C.; for example, about 230° C. to about 250° C. In one embodiment, dynamic vulcanization is carried out at a temperature from about 210° C. to about 230° C. Alternatively, dynamic vulcanization can be carried out at a temperature range from about 10° C. to about 50° C. above the melting temperature of the matrix resin; more preferably about 20° C. to about 40° C. above the melting temperature of the polyamide or mixed polyamide thermoplastic matrix.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet like structure of the composition can be formed into a laminate by coating at least one surface with an adhesive outer layer according to an embodiment.

By molding the thermoplastic elastomer composition obtained into a sheet, film, or tube using a T-sheeting die, straight or crosshead structure tubing die, inflation molding cylindrical die, etc. at the end of a single-screw extruder, or by calendering, it is possible to use the composition as the air permeation preventive layer, e.g., an innerliner, of a pneumatic tire and as a component or layer of a hose, etc.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled. In an embodiment, the laminate has a Mocon air permeation coefficient of less than 60, preferably less than 30, preferably less than $25 \times 10^{-12}$ cc cm/cm$^2$ sec cmHg at 30° C. as determined according to the method described herein.

Adhesive Layer

In one embodiment, the outer adhesive layer can have a Picma tack value to an unvulcanized diene-based rubber of 5 N/cm or more, preferably 7.5 N/cm or more, more preferably from about 10 to 50 N/cm. Picma Tack was determined on a Picma tester, according to methods known to one of skill in the art. The Picma testing was conducted using a contact time of 30 seconds, a rate of extension of 25 mm/min, a contact load of 500 µm, a temperature of 23° C., using a sample 12.5 mm wide and 150 mm long. The coated DVA film is put in contact with unvulcanized rubber with a 30 second contact time at a contact load of 500 g (4.9 N). The force when peeling the pieces apart is recorded as the tack (force per unit width, e.g., N/cm).

In an embodiment, the total thickness of the adhesive layer is less than or equal to about 10 microns, preferably less than or equal to about 5 microns, preferably less than or equal to about 4 microns, preferably less than or equal to about 3 microns, preferably less than or equal to about 2 microns, preferably less than or equal to about 1 micron, preferably less than or equal to about 0.5 microns, preferably less than or equal to about 0.1 microns, preferably less than or equal to about 0.05 microns, preferably less than or equal to about 0.01 microns.

In an embodiment, the adhesive composition is present on the surface of the dynamically vulcanized alloy film in an amount of less than or equal to about 5 g/m$^2$, preferably less than or equal to about 4 g/m$^2$, preferably less than or equal to about 3 g/m$^2$, preferably less than or equal to about 2 g/m$^2$, preferably less than or equal to about 1 g/m$^2$, preferably less than or equal to about 0.5 g/m$^2$, preferably less than or equal to about 0.1 g/m$^2$, preferably less than or equal to about 0.05 g/m$^2$, preferably less than or equal to about 0.01 g/m$^2$.

In an embodiment, the adhesive composition of the adhesive layer comprises a tackifier. In an embodiment, the adhesive compositions may comprise a thermoplastic elastomer. In an embodiment, the adhesive composition comprises as the matrix polymer any of various styrene-butadiene-based block copolymers (SBS), various styrene-isoprene block (SIS) copolymers, and their partial hydrogenates, including mixtures and combinations thereof, and the like. In an embodiment, the adhesive composition may comprise an epoxy-modified, i.e., epoxylated SBS (ESBS) having an oxirane oxygen functionality. This epoxy modification may be carried out by epoxylating, for example, a styrene-butadiene-based block copolymer (SBS) using peracids, hydroperoxides or the like. As peracids, performic acid, peracetic acid, perbenzoic acid, trifluoroperacetic acid, etc. may be useful. Further, as hydroperoxides, hydrogen peroxide, t-butyl hydroperoxide, cumene peroxide, etc., may be used. If the oxirane oxygen content of the ESBS thus obtained is too low, the bondability of the sublayer with the thermoplastic elastomer layer is liable to deteriorate, and therefore this is not preferred, while conversely if it is too high in the adhesive outer layer, the bondability with the tire rubber is liable to deteriorate, and therefore this is also not preferred.

In an embodiment, the adhesive composition may comprise ESBS with an oxirane oxygen content effective to bond with the thermoplastic elastomer layer, and the adhesive composition of the outer layer has a lower oxirane oxygen content than the sublayer. In a further embodiment the adhesive composition may comprise a curing agent in an amount effective for co-curing with a diene rubber with which it is placed in contact, e.g., in the adhesion of the film as an innerliner onto the rubber surface of a tire carcass, and the adhesive composition. In an embodiment, the adhesive composition may comprise a total of 100 parts by weight of the thermoplastic elastomer wherein the thermoplastic elastomer contains at least 50 parts by weight of the ESBS, preferably 60 to 100 parts by weight, so that an oxirane oxygen content becomes 1 to 5% or 1 to 3% by weight, preferably 1.2 to 2.8% by weight, by weight of the layer or sublayer.

In an embodiment, the adhesive composition does not include, or specifically excludes an epoxidized thermoplastic elastomer. In an embodiment, the adhesive composition, and thus the laminate is subject to the proviso that the adhesive does not include an epoxidized styrene-butadiene-based block copolymer having an oxirane oxygen content of 1 to 3% by weight. An example of the type of adhesive specifically excluded is found in U.S. Patent Application No. US2007/0031661, which is incorporated by reference herein for teachings related to such adhesive compositions.

In an embodiment, the adhesive composition present in the laminate comprises a resorcinol-formaldehyde resin and rubber latex composition, known in the art as RFL. The RFL composition may be used alone, or in combination with other adhesives, tackifiers, adjuvants, and the like.

In a preferred embodiment, the adhesive composition is an aqueous composition. In an embodiment, the adhesive composition may comprise a polyethyleneimine polymer, preferably a polyethyleneimine that has been chemically modified or functionalized. Examples include Mica H760 and H760A (available from Mica Corporation, Shelton, Conn.) Epomin P1050 (available from Nippon Shokubai), and the like. Polyethyleneimine polymers preferably include from 5 to 50 wt % tertiary amine functionality, from 5 to 75 wt % secondary amine functionality, and from 5 to 50 wt % primary amine functionality. For purposes herein, polyethyleneimine polymers are considered to be amino-functional polymers.

In an embodiment, the adhesive composition may comprise a cationically stabilizable amino-functional polymer having a number-average molecular weight of >3000, which exists in the presence of water as a solution or stable emulsion only when the pH is <=8, and which upon drying contains ethenically unsaturated moieties selected from the group consisting of acrylic, methacrylic, and enamine. In an embodiment, the amino-functional polymer may include at least one additional polymer selected from the group consisting of nonionic polymer and cationic polymer. In an embodiment, adhesive composition may include an aqueous composition comprising ethenically unsaturated moieties selected from the group consisting of acrylic, methacrylic, and enamine, wherein the adhesive coating composition comprises 70 to 99 wt. % of an amino-functional polymer and 1 to 30 wt. % of an unsaturation enhancer element.

In an embodiment, the adhesive composition may comprise i) a polymeric amine having a number-average molecular weight of >3000 and covalently bonded side chains of at least one of a) ethenically unsaturated moieties selected from the group consisting of acrylic, methacrylic, and enamine, and b) precursors of ethenically unsaturated moieties selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate; ii) epoxy cross-linking catalyst; and iii) cross-linking agent. Such suitable adhesive compositions are disclosed in U.S. Pat. No. 6,893,722B2, which is incorporated by reference herein.

In an embodiment, the adhesive composition may include an amino-functional polymer which further is a condensation product of a reaction between an amino-functional polymer comprising reactive amine hydrogens with a functionalizing agent or element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said functionalizing agent containing or forming upon drying an ethenically unsaturated moiety selected from the group consisting of acrylic, methacrylic, and enamine. In an embodiment of this aspect of the present invention, said functionalizing agent is selected from the group consisting of 2-hydroxy-3-chloropropylacrylate, glycidyl methacrylate (GMA), glycidyl acrylate, and acetoacetoxyethyl methacrylate (AAEM).

In an embodiment, the adhesive composition may include chemically modified polyethylene imine polymers modified through condensation reactions with ethenically unsaturated moieties selected from the group consisting of acrylic, methacrylic, and enamine, preferably 2-hydroxy-3-chloropropylacrylate, glycidyl methacrylate (GMA), glycidyl acrylate, acetoacetoxyethyl methacrylate (AAEM), or a combination thereof.

In an embodiment, the ratio of polyethylene-imine polymer to ethenically unsaturated moieties is from 0 to 100 parts of the ethenically unsaturated moiety to 100 parts of the polyethylene-imine polymer.

In an embodiment, the adhesive composition may further include, and/or may be applied to the dynamically vulcanized alloy film in combination with a coating process-facilitating adjuvant such as a nonionic wax dispersion, a cationic wax dispersion, a nonionic slip additive, a cationic slip additive, a cationic colloidal silica, a mineral filler, a plastic pigment, an adhesion promoter, a cross-linking compound, a curing catalyst, an anti-static additive, and/or a security taggant. Such additives are known to those skilled in the art.

Coating process-facilitating adjuvants may further include defoamers, wetting agents, lubricants, and the like. For example, the coating composition when applied to the substrate layer may not "wet out" uniformly, especially when such materials are applied in very thin layers. As a result, the dry but as yet uncured liquid mixture may retract into droplets or "islands". Also, high-speed application of coatings can generate foam. Volatile additives are generally preferred over non-volatile defoamers and surfactant-like wetting aids. Ethylene glycol monohexyl ether (commercially available as Hexyl Cellosolve™ from Union Carbide) facilitates wetting of the coating on the plastic substrate and helps to control foam. Other alcohols and glycol ethers like Dowanol™ PM made by Dow Chemical Company can serve a similar function. Typically the wet coating formulation can comprise from 0.2% up to about 10% by weight of such volatile processing additives.

Nonionic or cationic wax emulsions can improve block resistance or lower the coefficient of friction. Michemlube 156, produced by Michelman, Inc., is one of many suitable emulsions that are compatible with the cationic emulsion polymers disclosed in this invention. Such materials are generally unnecessary in cross-linked systems, but those skilled in the art know that such materials are important for balancing properties in coatings that contain little or no cross-linking. Depending upon the application, up to 15% of the dried film can comprise wax.

Slip additives besides wax include synthetic particulates like Nippon Shokubai's Epostar™ poly(methyl methacrylate) spheres that are 1 to 6 microns in diameter dispersed in water or alcohol containing a small amount of nonionic or cationic surfactant to aid dispersion. Equally useful are similarly dispersed non-meltable poly(monoalkylsiloxanes) having a mean particle size of about 0.5 to about 20 microns and a three-dimensional structure of siloxane linkages. Such materials are commercially available from Toshiba Silicone Co., Ltd and they are marketed under the trade name Tospearl™.

Dupont Specialty Chemicals manufactures two grades of colloidal silica: Ludox® CL (average particle size 0.012 micron) and Ludox® CL-P (average particle size 0.022 micron). These materials can lower the coefficient of friction. Some applications might require that the dried film contain up to 60% colloidal silica. Other applications require none at all.

Examples of mineral fillers and pigments particularly suitable for use in cationic emulsions are found in U.S. Pat. No. 6,025,059 to McGee et al. and are incorporated herein by reference. Such additives could be expanded to include dyes and pigments to impart color to the coated film.

Other useful adhesion promoters can be incorporated into the coatings to improve anchorage of the coating to a substrate. Examples of adhesion promoters include, but are not limited to, chelated alkoxy titanates marketed under the trade name "Vertec" are available from Synetix (a division of Imperial Chemical Industries PLC), Silquest® Silanes from Crompton Corporation, or derivatives of phosphinic acid, phosphonic acid, or phosphoric acid as described in U.S. Pat. No. 4,223,115 to Zaruda et al., incorporated herein by reference.

The adhesive composition according to the present invention may contain any suitable tackifier. In one embodiment, the tackifier is selected from aliphatic resins such as, for example, piperylene resins and terpene resins, and aromatic modified aliphatic resins, as well as combinations thereof, and the like. Suitable tackifiers herein are commercially available under the trade designations ESCOREZ (ExxonMobil Chemical Co.), e.g., ESCOREZ 1102, ESCOREZ 1310, ESCOREZ 1315; and YS Resin (Yasuhara Chemical), e.g., YS Resin D105.

In an embodiment, the tackifier comprises a piperylene resin having a softening point from 70° to 140° C. and a number average molecular weight Mn from 800 to 1600.

In another embodiment, the tackifier comprises a specific terpene resin (A) or a mixture of a terpene resin (A) and an aromatically modified terpene resin (B). In one embodiment, the terpene resin (A) and the terpene resin (B) have a weight average molecular weight Mw of 1000 or less and a softening point of 60° to 120° C. Here, "terpene" is the general term for the series of compounds having isoprene units. A "terpene resin" is a homopolymerized or copolymerized product mainly composed of oil obtained from pine tree resin or citrus fruit peel (e.g., α-pinene, β-pinene, dipentene (limonene), etc.). The terpene resin (A) usable in the present invention is preferably a copolymer of β-pinene and dipentene or a homopolymer of dipentene. The aromatically modified terpene resin (B) can be produced by causing the terpene resin (A) to co-condense with a phenol, alkylphenol, etc. A commercially available product may also be used. The amount of the aromatic modification of the aromatically modified terpene resin (B) is not particularly limited, but preferably is about 1 to 20% by weight based upon the weight of the terpene resin.

The ratio of the terpene-based resin (A)/the aromatically modified terpene resin (B) in the present invention may be changed according to the working environmental conditions (e.g., temperature, humidity, etc.) and the degree of tack of the tire members. If the ratio of the terpene resin is greater, the self tack and the tack to metal or vulcanized rubber are decreased and the workability is improved, while conversely if the ratio of the aromatically modified terpene resin is greater, the tack with the unvulcanized tire member is improved. In an embodiment, the present inventors found that, if (A):(B) is made 100:0 to 50:50 (weight ratio), preferably 100:0 to 70:30, a good balance thereof can be obtained.

The adhesive composition according to an embodiment may optionally contain therein an internal mold release agent, which may include stearic acid or oleic acid and their metal salts.

In an embodiment, the adhesive composition may include a crosslinking or vulcanization cure package, which may include sulfur, zinc oxide, and fatty acids and mixtures thereof; metal oxides (i.e., zinc oxide, ZnO), organometallic compounds, radical initiators, etc.; ZnO, CaO, MgO, $Al_2O_3$, $CrO_3$, FeO, $Fe_2O_3$, and NiO and the corresponding metal stearate complex (e.g., the stearate salts of Zn, Ca, Mg, and Al), or with stearic acid, and either a sulfur compound or an alkylperoxide compound. Suitable vulcanization cure packages for the adhesive compositions of one embodiment of the present invention include zinc oxide in combination with zinc stearate or stearic acid and, optionally, one or more of accelerators or vulcanizing agents. Curative accelerators include amines, guanidines, thioureas, thiazoles, thiurams, sulfenamides, sulfenimides, thiocarbamates, xanthates, and the like.

In one embodiment, as the cross-linking agent, an organic peroxide having a one-minute half-life temperature of 160° C. or more, preferably 165 to 190° C., is used for the crosslinking in an amount of 0.1 to 2 parts by weight, preferably 0.3 to 1 part by weight. As such an organic peroxide, specifically, for example, dicumyl peroxide, di-t-butyl peroxide, t-butylcumyl peroxide, benzoyl peroxide, 2,5-dimethyl-2,5-di(t-butylperoxy)hexine-3,2,5-dimethyl-2,5-di(t-butylperoxy)hexane, 1,3-bis(t-butylperoxyisopropyl)benzene, 4,4-di-t-butylperoxy-valerenate-n-butyl ester, etc. may be used.

Accordingly, a laminate according to the instant disclosure comprises an air permeation preventive layer and an adhesive layer, which may be formed in a cylindrical (tubular) shape with the air permeation preventive layer of the thermoplastic elastomer composition composed of a thermoplastic resin, as a continuous phase and a rubber composition, as a dispersed phase, at the inside of the tube and the adhesive composition at the outside of the tube, preferably which comprises a superior in the bondability with a tire carcass and by virtue of a relatively thin coating of adhesive, contributes to a reduction of tire weight.

As the diene-based rubber, any diene-based rubber usable for a tire, including those mentioned above, for example, natural rubber (NR), polyisoprene rubber (IR), various types of styrene-butadiene copolymer rubber (SBR), various types of polybutadiene rubber (BR), acrylonitrile-butadiene copolymer rubber (NBR), and further an ethylene-propylene-diene copolymer (EPDM), (halogenated) butyl rubber, etc. may be mentioned. These may be used alone or in any blend thereof.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. However, carbon black, if used at all, is typically no more than about 5 parts per hundred of rubber (phr); preferably less than about 4 phr; more preferably less than about 3 phr; most preferably less than about 2 phr; for example, about 1 phr or less, such as about 0.1 to about 1.5 phr; for example about 0.25 to about 1.0 phr. In one embodiment, carbon black can be added to the adhesive layer and/or sublayer as a masterbatch, e.g., in a carrier resin such as polyethylene. Alternatively, useful compositions can be prepared without carbon black. The filler may also include other reinforcing or non-reinforcing materials such as silica, clay, calcium carbonate, talc, titanium dioxide and the like. The filler may be present at a level of from 0 to about 5 percent by weight of the rubber present in the composition; such as about 0.5 to about 4 wt %; or about 1.0 to about 3 wt %; such as about 1 to about 2 wt %.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010, IRGANOX 3052, and IRGANOX 1076 from Ciba Specialty Chemicals (Basel, Switzerland). In one embodiment, the adhesive composition comprises from 0.01 to 3 wt % of total antioxidant on an active or neat basis (excluding inerts in as-received commercially available antioxidant packages, and including any antioxidant in the blend components such as SBS), preferably from 0.05 to 2 wt %.

As discussed above, a process or plasticizer oil may be present in the compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

Laminate

Figure 1:
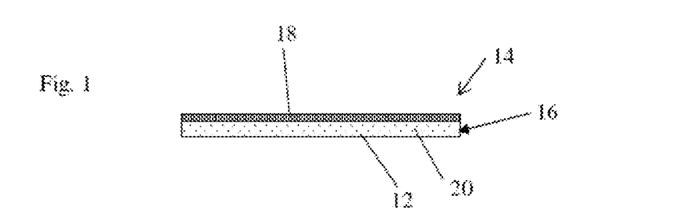
FIG. 1 is a cross section of a laminate according to an embodiment.

FIG. 1 shows a schematic cross section of the laminate 14 according to an embodiment of the instant disclosure. The air barrier layer 16 comprises the dynamically vulcanized alloy comprising the thermoplastic elastomer comprising a continuous thermoplastic phase 12 and a rubber dispersed phase 20. Laminate 14 further includes an adhesive layer 18 disposed on at least one side of dynamically vulcanized alloy film 16.

Figure 2:
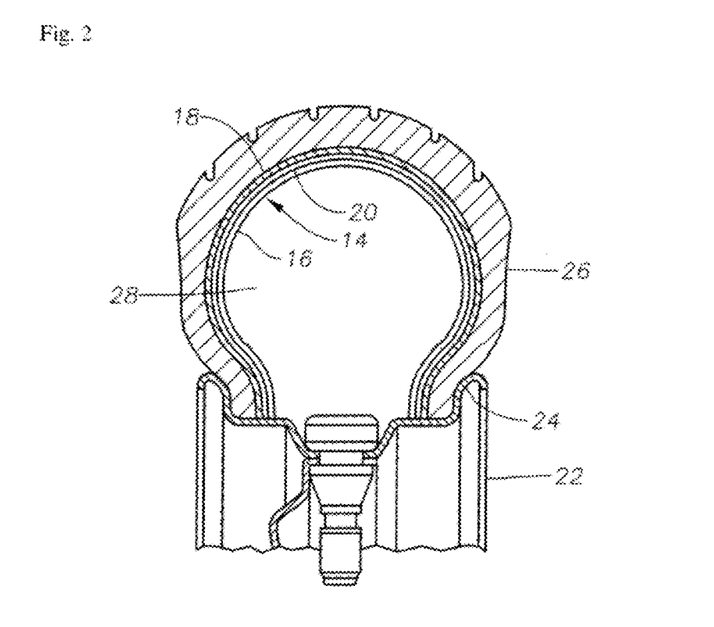
FIG. 2 is a cross section of a tire incorporating the laminate of FIG. 1 as an innerliner according to an embodiment.

FIG. 2 shows a schematic cross section of a pneumatic tire in which tire body 26 is mounted on the rim 22 at the flange 24 enclosing an air chamber 28. The laminate 14 (see FIG. 1) forms an innerliner with adhesive layer 18 co-vulcanized at the inner surface of the tire body 26 and air barrier layer 16 facing the air chamber 28.

Tire Production

In the process for molding a green tire, the innerliner layer is first wrapped over a forming drum, then the carcass material, bead material, sidewall material, and the like are successively laid on top. The innerliner, carcass, bead, sidewall, and other members wrapped on the drum are then inflated for application of the belt and cap tread. A tie-gum layer may also be added between the treads and the innerliner to prevent damage to the innerliner from mechanical action of the belts during use. Upon inflation, the green (uncured) tire deforms considerably, but the joins of the members are locally high in rigidity and therefore the joins deform relatively slightly at the time of inflation. This may cause deterioration of the tire uniformity. However, the use of the laminate disclosed herein as an innerliner acts to ease the difference in deformation. The thermoplastic film and other members are preferably joined by a strong tackiness. The green tire is then cured by heating in a mold for a period of time to produce the tire.

When the innerliner is supplied as a tube, the tube may be cut and placed over the forming drum and the other components subsequently applied. When the innerliner is a flat sheet, the sheet must be wrapped around the forming drum with the ends of the sheet having an overlap. The overlapping ends are then sealed to one another. This seal must have enough strength to withstand subsequent process steps without breaking, yet allow for subsequent adjustment during the manufacture process.

Coating Process

In an embodiment, the coating of the dynamically vulcanized alloy film may comprise coating of a blown film in a tubular shape. Accordingly, in an embodiment, the process may include coating of the dynamically vulcanized alloy film which is a blown film comprising an infinite number of sides. In an embodiment, the coating process may include coating of a sheet of a dynamically vulcanized alloy film, which may be coated on one side or both sides. In an embodiment, the process may include coating of a blow film in a tubular shape, followed by splitting of the tubular shape to produce a sheet of the dynamically vulcanized alloy film coated on one side. The splitting of the tubular film may be done prior to or after coating with the adhesive composition.

In an embodiment, the coating process comprises gravure coating, reverse roll coating, knife over roll coating, metering rod coating, slot die coating, dip coating, curtain coating, air knife coating, or a combination thereof.

Figure 3:
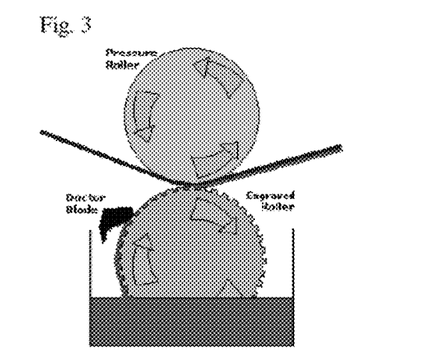
FIG. 3 is a schematic view of a gravure coating process line for making a laminate according to an embodiment.

As shown in FIG. 3, in an embodiment, the gravure coating process may include using an engraved roller running in a coating bath, which fills the engraved dots or lines of the roller with the coating material e.g., the adhesive composition. The excess coating on the roller may then be wiped off by a doctor blade and the coating is then deposited onto the substrate i.e., the dynamically vulcanized alloy film, as it passes between the engraved roller and a pressure roller.

Figure 4:
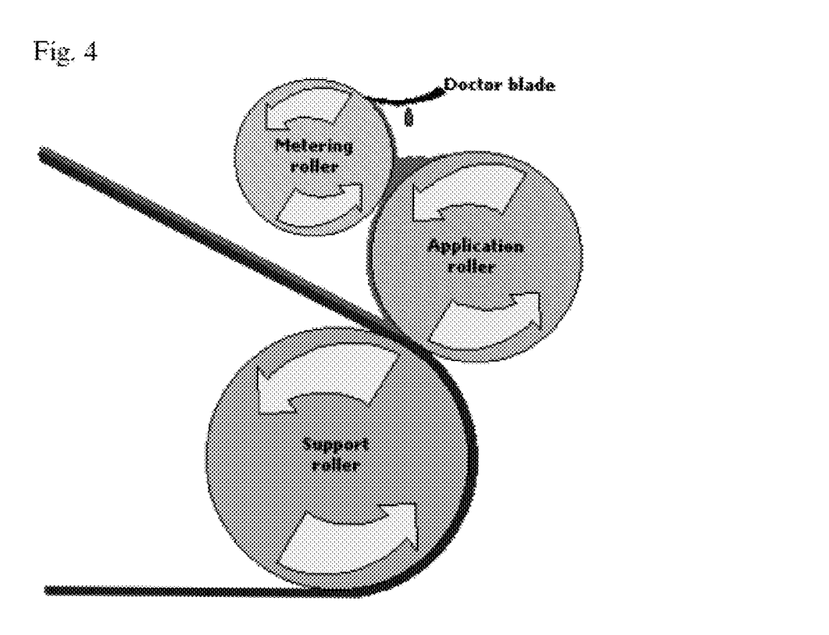
FIG. 4 is a schematic view of a reverse roll coating process line for making a laminate according to an embodiment.

As shown in FIG. 4, in an embodiment, the reverse roll coating process may include measuring the adhesive composition onto an applicator roller by precision setting of a gap between an upper metering roller and an application roller arranged below it. The coating may then be 'wiped' off of the application roller by the film as it passes around a support roller at the bottom. FIG. 4 illustrates a 3-roll reverse roll coating process, although 4-roll versions (not shown) may also be used.

Figure 5:
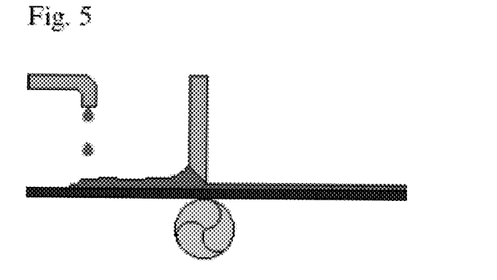
FIG. 5 is a schematic view of a knife over roll coating or "gap coating" process line for making a laminate according to an embodiment.

As shown in FIG. 5, in an embodiment, the knife over roll coating process, also referred to in the art as a "gap coating" process may include applying the adhesive composition to the moving film which then passes through a 'gap' between a 'knife' and a support roller. As the coating and substrate pass through, the excess adhesive composition is scraped off. This process is preferred for use with high viscosity coatings and very high coat weights.

Figure 6:
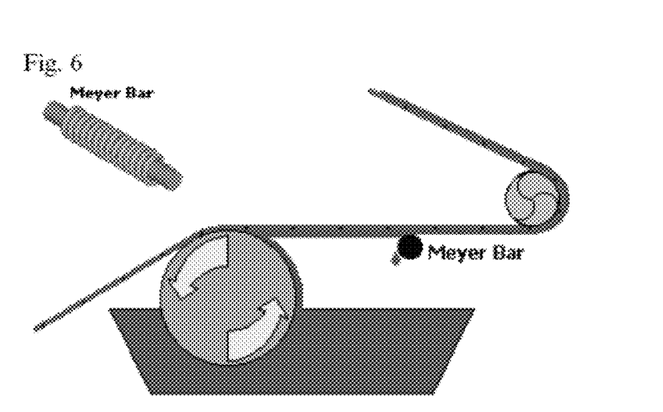
FIG. 6 is a schematic view of a metering rod or Meyer rod coating process line for making a laminate according to an embodiment.

As shown in FIG. 6, in an embodiment, the metering rod coating process, also referred to in the art as the "Meyer rod" coating process, may include depositing an excess amount of the adhesive composition onto the moving film as it passes over a bath roller. The excess coating may then be removed from the substrate by passing the coated substrate over a wire-wound metering rod, sometimes known as a Meyer Rod. The quantity of the coating which remains on the substrate is determined by the diameter and shape of the wire used on the rod.

Figure 7:
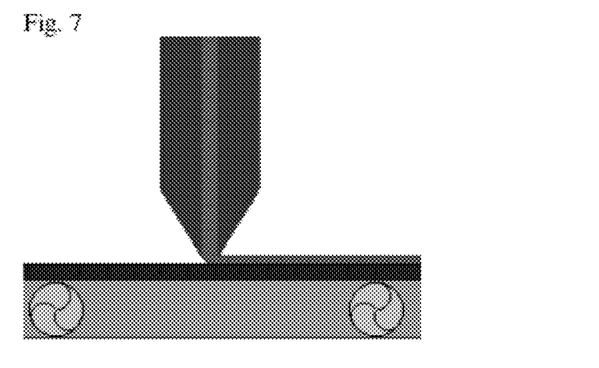
FIG. 7 is a schematic view of a slot die or slot extrusion coating process line for making a laminate according to an embodiment.

As shown in FIG. 7, in an embodiment, the slot die coating process, also referred to in the art as slot extrusion, may include metering a flow of the adhesive composition out of a slot (by gravity or under pressure) and then onto the substrate.

Figure 8:
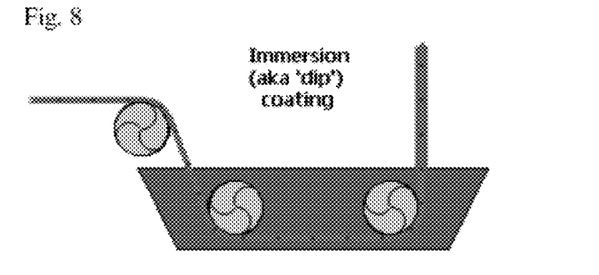
FIG. 8 is a schematic view of an immersion or dip coating process line for making a laminate according to an embodiment.

As shown in FIG. 8, in an embodiment, the immersion or dip coating process may include dipping the film into a bath of the adhesive coating, which is preferably of a low enough viscosity to enable the coating to run back into the bath as the substrate emerges. In this embodiment, a blown film of the process may be coated such that only the outer surface of the tube is coated with the adhesive composition. In an embodiment, the coated tube may be subsequently split open to produce a sheet or ribbon coated on one side only. This sheet or ribbon may be subsequently coated to produce a dynamically vulcanized alloy film coated on both sides. In this embodiment, the coating on one side of the laminate may be the same or may be different than the coating on the opposite side of the laminate. This coating process may further include use of a metering rod or knife to remove excess coating from the film.

Figure 9:
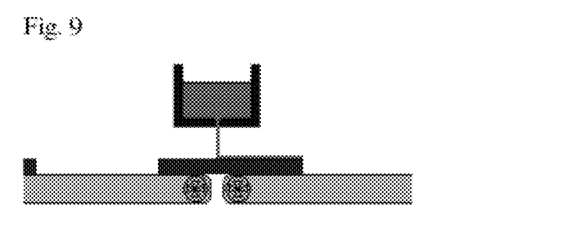
FIG. 9 is a schematic view of a curtain coating process line for making a laminate according to an embodiment.

As shown in FIG. 9, in an embodiment, the curtain coating process may include metering a flow of the adhesive coating through a slot to produce a continuous curtain of the coating which falls into a gap between two conveyors. The film is passed along the conveyor at a controlled speed and so receives the coating on its upper face.

Figure 10:
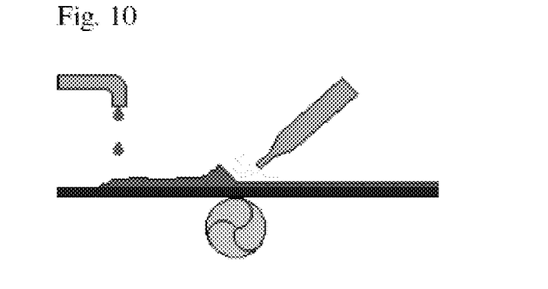
FIG. 10 is a schematic view of an air knife coating process line for making a laminate according to an embodiment.

As shown in FIG. 10, in an embodiment, the air knife coating process may include applying the adhesive composition to the substrate and removing the excess material using powerful jets of air from the air knife.

In an embodiment, the process may further include a pre-treatment step prior to the coating step, wherein the surface of the dynamically vulcanized alloy film is pre-treated to improve adhesion of the adhesive composition. Suitable pre-treatments steps include physical abrasion, chemical treatments, flame treatment, corona discharge, and the like. In an embodiment, corona discharge pretreatment includes passing the dynamically vulcanized alloy film between a grounded metal base roll and an electrode. Between the base roll and the electrode is an air gap, which is usually set between 1 and 2 mm. A high electrical voltage is introduced between the electrode and the base roll such that the air between the electrode and the base roll becomes conductive at the peak of each electrical cycle and sparking occurs across the gap. As the sparking occurs, the air is suddenly ionized producing the corona discharge. The frequency of operation preferably varies between 1 KHz and 50 KHz, with output voltages in the range of 10-15 Kvolts.

EMBODIMENTS

Accordingly, the present invention provides the following embodiments of the invention:

A. A process to produce a laminate comprising: coating at least an outer surface of a dynamically vulcanized alloy film with an adhesive composition to produce the laminate, wherein the adhesive layer has a thickness of less than or equal to about 10 microns, wherein the dynamically vulcanized alloy film comprises a thermoplastic elastomer composition containing a thermoplastic resin as a continuous phase, and a rubber composition dispersed therein, as a dispersed phase;

B. The embodiment according to embodiment A, wherein the dynamically vulcanized alloy film is a blown film comprising an infinite number of sides;

C. The embodiment according to any one of embodiments A or B, wherein the coating of the dynamically vulcanized alloy film comprises gravure coating, reverse roll coating, knife over roll coating, metering rod coating, slot die coating, dip coating, curtain coating, air knife coating, or a combination thereof;

D. The embodiment according to any one or any combination of embodiments A-C, wherein the adhesive coating is deposited on the surface of the dynamically vulcanized alloy film at a rate of less than or equal to about 5 g/m$^2$;

E. The embodiment according to any one or any combination of embodiments A-D, wherein the laminate has a Mocon air permeation coefficient of less than or equal to about $25 \times 10^{-12}$ cc cm/cm$^2$ sec cm Hg at 30° C.;

F. The embodiment according to any one or any combination of embodiments A-E, wherein the adhesive layer has a Picma tack to an unvulcanized diene-based rubber of greater than or equal to about 5 N/cm;

G. The embodiment according to any one or any combination of embodiments A-F, wherein the adhesive layer has a Picma tack to an unvulcanized diene-based rubber of about 10 N/cm to about 50 N/cm;

H. The embodiment according to any one or any combination of embodiments A-G, wherein the thermoplastic of the continuous phase comprises a polyamide and wherein the rubber composition of the dispersed phase comprises a halogenated copolymer of isobutylene and para-methylstyrene;

I. The embodiment according to any one or any combination of embodiments A-H, subject to the proviso that the adhesive composition does not include an epoxidized styrene-butadiene-based block copolymer;

J. The embodiment according to any one or any combination of embodiments A-I, wherein the thermoplastic elastomer composition comprises plasticizer, and wherein prior to coating of the dynamically vulcanized alloy film with the adhesive composition, the thermoplastic elastomer composition is treated to reduce the amount of plasticizer present in the thermoplastic elastomer composition or on a surface thereof;

K. The embodiment according to any one or any combination of embodiments A-J, wherein the thermoplastic elastomer composition comprises butylbenzylsulfonamide (BBSA), poly(isobutylene succinic anhydride), or a combination thereof, and wherein prior to coating of the dynamically vulcanized alloy film with the adhesive composition, the thermoplastic elastomer composition is heated to a temperature and for a period of time sufficient to reduce the amount of BBSA, poly(isobutylene succinic anhydride), or a combination thereof, present in the thermoplastic elastomer composition relative to the amount of BBSA, poly(isobutylene succinic anhydride), or a combination thereof, present in the thermoplastic elastomer composition prior to said heating;

L. The embodiment according to any one or any combination of embodiments A-K, wherein the thermoplastic elastomer composition comprises butylbenzylsulfonamide (BBSA), poly(isobutylene succinic anhydride), or a combination thereof, and wherein prior to coating of the dynamically vulcanized alloy film with the adhesive composition, the thermoplastic elastomer composition is contacted with a solvent for a period of time, and in an amount sufficient to reduce the amount of BBSA, poly(isobutylene succinic anhydride), or a combination thereof, present in the thermoplastic elastomer composition relative to the amount of BBSA, poly(isobutylene succinic anhydride), or a combination thereof, present in the thermoplastic elastomer composition prior to said contact with the solvent;

M. The embodiment according to any one or any combination of embodiments A-L, wherein the adhesive composition comprises a polyethyleneimine;

N. The embodiment according to any one or any combination of embodiments A-M, wherein the adhesive composition comprises a polyethyleneimine polymer functionalized with an ethenically unsaturated moiety selected from the group consisting of acrylic, methacrylic, enamine, and a combination thereof;

O. The embodiment according to any one or any combination of embodiments A-N, wherein the adhesive composition comprises a polyethyleneimine polymer functionalized with an ethenically unsaturated moiety selected from the group consisting of 2-hydroxy-3-chloropropylacrylate, glycidyl methacrylate, glycidyl acrylate, acetoacetoxyethyl methacrylate, and a combination thereof;

P. The embodiment according to any one or any combination of embodiments A-O, wherein the adhesive composition comprises a functionalized amino-functional polymer which is a condensation product of a reaction between an amino-functional polymer comprising reactive amine hydrogens with a functionalizing agent selected from the group consisting of a halo-functional monomer, a halo-functional oligomer, a carbonyl-functional monomer, a carbonyl-functional oligomer, an epoxy-functional monomer, an epoxy-functional oligomer, a poly-functional acrylic monomer, a poly-functional acrylic oligomer, a poly-functional methacrylic monomer, a poly-functional methacrylic oligomer, and combinations thereof;

Q. The embodiment according to any one or any combination of embodiments A-P, wherein the adhesive composition comprises a functionalized amino-functional polymer which is a condensation product of a reaction between an amino-functional polymer comprising reactive amine hydrogens with a functionalizing agent selected from the group consisting of 2-hydroxy-3-chloropropylacrylate, glycidyl methacrylate, glycidyl acrylate, acetoacetoxyethyl methacrylate, and combinations thereof;

R. The embodiment according to any one or any combination of embodiments A-Q, further comprising incorporating the laminate into a tire as an innerliner;

S. A laminate comprising the laminate produced according to the embodiment of any one or any combination of embodiments A-R; and T. A pneumatic tire comprising the laminate of embodiment S.

EXAMPLES

Several samples were prepared on a Virton Lab Coater in which the DVA innerliner substrate was coated with different adhesive compositions. Corona treatment of the films was employed to promote wetting of the film with the adhesive. The following conditions were typical in producing the laminates.

72-Quad gravure cylinder

Coating speed: 0.202 m/s (40 fpm)

IR heater: On

Drying T: 110° C. (230° F.)

Picma Tack was determined on a Picma tester, according to methods known to one of skill in the art. The Picma testing was conducted using a contact time of 30 seconds, a rate of extension of 25 mm/min, a contact load of 500 gm, a temperature of 23° C., using a sample 12.5 mm wide and 150 mm long. The coated DVA film is put in contact with unvulcanized rubber with a 30 second contact time at a contact load of 500 g (4.9 N).

Peel strength was determined according to ASTM D-903. Prior to being vulcanized, sample is prepared at room temperature then followed by applying 5 kg of load through a hand roller for 3 times to remove the air between the layers. Samples were prepared not more than 6 hrs prior to vulcanization. The molding of the vulcanization condition was 160° C. at 30 min. The testing speed was 50 mm/min using a specimen width of 25 mm and a load cell of 1 kN.

Several adhesive compositions were prepared by reaction of a poly-amino-functional polymer, e.g., Mica H760A (PEI, proprietary functionalized polyethylene imine, Mica Corporation, Shelton, Conn.) and a material containing acetoacetate functionality (ethyl acetoacetate [EtOAcAc] or acetoacetoxyethyl methacrylate [AAEM]. The blends were prepared by mixing the amino-functional polymer with water. Once dissolved, the AcAc-functional material was added. At ≥10% solids, the AcAc-functional material was added while the poly-amine was stirring to minimize kickout. The following Table 1 summarizes the blends of adhesive compositions that were prepared:

TABLE 1

| Blend # | PEI Type | PEI phr | AcAc Type | AcAc Phr | Solids % | pH | Comments |
|---|---|---|---|---|---|---|---|
| 1 | Mica H760A | 100 | None | 0 | 1.5 | 8.83 | Clear, faint yellow; 3.7 cP |
| 2 | Mica H760A | 100 | AAEM | 25 | 1.5 | 8.18 | Clear, amber; 3.5 cP |
| 3 | Mica H760A | 100 | AAEM | 50 | 1.5 | 7.79 | Clear, dark amber; 3.2 cP |

The RFL coating was prepared by combining the components listed in Table 2. The resorcinol and formaldehyde were first mixed in water with a suspension of latex in water at a basic pH obtained by addition of NaOH. The composition obtained was then left to mature for several hours at room temperature prior to use.

TABLE 2

| Component | Supplier | % solids | Phr | grams |
|---|---|---|---|---|
| Water | | | | 874 |
| NaOH | | 10 | 0.45 | 14.1 |
| Penacolite R-2170 | Indspec Chem Corp. | 75 | 12.6 | 52.5 |
| Formaldehyde | | 30 | 4.51 | 47 |
| Pyratex 240 | Polymer Latex | 41 | 100 | 762.5 |

Prior to coating, the Exxcore™ DVA innerliner substrate was first heated at 100° C. in an oven to remove BBSA. The Laminate samples were then prepared by coating the DVA film with the various adhesive compositions as described in Table 3.

TABLE 3

| Sample ID | Coating Type | Dry Coating weight (g/m$^2$) | Peel strength (N/cm) | Picma Tack (N/cm) |
|---|---|---|---|---|
| DVA-1 | RFL 28% solids from Table 2 | 3.4 | 22.0 | 2.85 |
| DVA-2 | RFL 19% solids | 2.3 | >34.6 | 2.39 |
| DVA-3 | Blend 1 from Table 1 plus 0.05 wt % Tergitol 15-S-9 | 0.18 | 31.3 | 5.94 |
| DVA-4 | Blend 2 from Table 1 plus 0.05 wt % Tergitol 15-S-9 | 0.18 | 33.7 | 9.18 |
| DVA-5 | Blend 3 from Table 1 plus 0.05 wt % Tergitol 15-S-9 | 0.18 | 20.0 | 2.70 |

The RFL composition of Sample DVA-1 was diluted with water.

As the data show, the functionalized ethyleneimine polymers provided both adequate peel strength and improved Picma tack at very low coating weights.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claim.

What is claimed is:

1. A process to produce a laminate comprising:
coating at least an outer surface of a dynamically vulcanized alloy film with an adhesive composition to produce the laminate, wherein the adhesive layer has a thickness of less than or equal to about 10 microns, wherein the dynamically vulcanized alloy film comprises a thermoplastic elastomer composition containing a thermoplastic resin as a continuous phase, and a rubber composition dispersed therein, as a dispersed phase,
wherein the adhesive composition comprises i) a polyethyleneimine polymer functionalized with an ethenically unsaturated moiety selected from the group consisting of acrylic, methacrylic, enamine, and a combination thereof or ii) a functionalized amino-functional polymer which is a condensation product of a reaction between an amino-functional polymer comprising reactive amine hydrogens with a functionalizing agent selected from the group consisting of a halo-functional monomer, a halo-functional oligomer, a carbonyl-functional monomer, a carbonyl-functional oligomer, an epoxy-functional monomer, an epoxy-functional oligomer, a poly-functional acrylic monomer, a poly-functional acrylic oligomer, a poly-functional methacrylic monomer, a poly-functional methacrylic oligomer, and combinations thereof.

2. The process according to claim 1, wherein the dynamically vulcanized alloy film is a blown film.

3. The process according to claim 1, wherein the coating of the dynamically vulcanized alloy film comprises gravure coating, reverse roll coating, knife over roll coating, metering rod coating, slot die coating, dip coating, curtain coating, air knife coating, or a combination thereof.

4. The process according to claim 1, wherein the adhesive layer is deposited on the surface of the dynamically vulcanized alloy film in an amount of less than or equal to about 5 g/m$^2$.

5. The process according to claim 1, wherein the laminate has a Mocon air permeation coefficient of less than or equal to about $25 \times 10^{-12}$ cc cm/cm$^2$ sec cm Hg at 30° C.

6. The process according to claim 1, wherein the adhesive layer has a Picma tack to an unvulcanized diene-based rubber of greater than or equal to about 5 N/cm.

7. The process according to claim 1, wherein the adhesive layer has a Picma tack to an unvulcanized diene-based rubber of greater than or equal to about 10 to about 50 N/cm.

8. The process according to claim 1, wherein the thermoplastic resin of the continuous phase comprises a polyamide and wherein the rubber composition of the dispersed phase comprises a halogenated copolymer of isobutylene and paramethylstyrene.

9. The process according to claim 1, subject to the proviso that the adhesive composition does not include an epoxidized styrene-butadiene-based block copolymer.

10. The process according to claim 1, wherein the thermoplastic elastomer composition comprises plasticizer, and wherein prior to coating of the dynamically vulcanized alloy film with the adhesive composition, the thermoplastic elastomer composition is treated to reduce the amount of plasticizer present in the thermoplastic elastomer composition or on a surface thereof.

11. The process according to claim 1, wherein the thermoplastic elastomer composition comprises butylbenzylsulfonamide (BBSA), poly(isobutylene succinic anhydride), or a combination thereof, and wherein prior to coating of the dynamically vulcanized alloy film with the adhesive composition, the thermoplastic elastomer composition is heated to a temperature and for a period of time sufficient to reduce the amount of BBSA, poly(isobutylene succinic anhydride), or a combination thereof, present in the thermoplastic elastomer composition relative to the amount of BBSA, poly(isobutylene succinic anhydride), or a combination thereof, present in the thermoplastic elastomer composition prior to said heating.

12. The process according to claim 1, wherein the thermoplastic elastomer composition comprises butylbenzylsulfonamide (BBSA), poly(isobutylene succinic anhydride), or a combination thereof, and wherein prior to coating of the dynamically vulcanized alloy film with the adhesive composition, the thermoplastic elastomer composition is contacted with a solvent for a period of time, and in an amount sufficient to reduce the amount of BBSA, poly(isobutylene succinic anhydride), or a combination thereof, present in the thermoplastic elastomer composition relative to the amount of BBSA, poly(isobutylene succinic anhydride), or a combination thereof, present in the thermoplastic elastomer composition prior to said contact with the solvent.

13. The process of claim 1, wherein the adhesive composition comprising the i) polyethyleneimine polymer functionalized with an ethenically unsaturated moiety is selected from the group consisting of 2-hydroxy-3-chloropropylacrylate, glycidyl methacrylate, glycidyl acrylate, acetoacetoxyethyl methacrylate, and a combination thereof.

14. The process of claim 1, wherein the adhesive composition comprising the ii) functionalized amino-functional polymer wherein the functionalizing agent is selected from the group consisting of 2-hydroxy-3-chloropropylacrylate, glycidyl methacrylate, glycidyl acrylate, acetoacetoxyethyl methacrylate, and combinations thereof.

* * * * *